(12) United States Patent
Hutzler et al.

(10) Patent No.: US 6,580,221 B2
(45) Date of Patent: Jun. 17, 2003

(54) METHOD FOR TRIGGERING A SENSOR-CONTROLLED LAMP

(75) Inventors: Michael Hutzler, Hoechstadt (DE); Juergen Schurig, Ottobrunn (DE); Gunther Loehmann, Seltz (FR)

(73) Assignee: Patent-Treuhand-Gesellschaft fur Elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/008,122

(22) Filed: Oct. 19, 2001

(65) Prior Publication Data
US 2002/0057569 A1 May 16, 2002

(30) Foreign Application Priority Data
Oct. 23, 2000 (DE) .......................... 100 52 541

(51) Int. Cl.[7] .............................................. H05B 37/02
(52) U.S. Cl. ..................... 315/149; 315/158; 315/159; 362/276
(58) Field of Search .................... 315/149, 156, 315/158, 150, 151, 129, 226, 293, 307; 362/276, 802

(56) References Cited

U.S. PATENT DOCUMENTS

| 4,996,606 | A | * | 2/1991 | Kawai et al. ................ 358/475 |
| 5,367,223 | A | * | 11/1994 | Eccher ........................ 315/97 |
| 6,028,396 | A | * | 2/2000 | Morrissey, Jr. et al. ..... 315/119 |
| 6,160,352 | A | | 12/2000 | Steinel |
| 6,188,177 | B1 | * | 2/2001 | Adamson et al. ........... 315/149 |
| 6,393,382 | B1 | * | 5/2002 | Williams et al. ............ 702/188 |
| 6,483,245 | B1 | * | 11/2002 | Weindorf et al. ............. 315/82 |

FOREIGN PATENT DOCUMENTS

DE   195 14 973 A1   10/1986

\* cited by examiner

*Primary Examiner*—Don Wong
*Assistant Examiner*—Shih-Chao Chen

(57) ABSTRACT

A sensor-controlled lamp and a method for triggering it. The sensor signals are evaluated by means of a microprocessor, and on the basis of the change over time in the sensor signals, operating parameters of the lamp controller are changed or activated.

15 Claims, 4 Drawing Sheets

METHOD FOR TRIGGERING A SENSOR-CONTROLLED LAMP

FIELD OF THE INVENTION

The invention relates to a method for triggering a sensor-controlled lamp in which the incident light is detected via a light sensor, and via a control unit a luminous medium of the lamp is triggered as a function of the sensor signal, and to a sensor-controlled lamp having at least one sensor for detecting the incident light and having a control unit for triggering the lamp as a function of the sensor signal.

BACKGROUND OF THE INVENTION

From German Patent Disclosure DE 195 14 973 A1, a fluorescent lamp is known in which the triggering of a ballast for the discharge vessel of the fluorescent lamp is carried out as a function of the signal of a light sensor, by which the incidence of light from the environment is detected.

One problem in such fluorescent lamps is that the incident light from the environment is superimposed on the incident lamp light itself, thus adulterating the signal detected by the light sensor. This problem is exacerbated by the fact that the spectrum of the light emitted by the discharge vessel changes after the lamp is started, since the proportion of infrared radiation immediately after the lamp is started is relatively high and drops off to a lower value again after a certain starting time (burn-in time). Hence when infrared sensors are used, the infrared light contained in normal daylight is augmented by the infrared component emitted in the burn-in phase, and thus the signal detected by the sensor is adulterated in the burn-in phase. This adulteration of the sensor signal can mean for instance that the fluorescent lamp initially starts as the ambient light fades, then turns off again after starting because the sensors, as a result of the infrared component of the lamp light itself, detect a signal that indicates greater brightness than is actually present, and so the lamp is turned off again despite the low incident light from the environment.

This disadvantage is overcome by DE 195 14 973 A1 by the provision that when the fluorescent lamp is started, an idle time member is switched, so that during a predetermined idle time, no triggering of the fluorescent lamp in response to a change in the sensor signals occurs. This idle time is adapted to the maximum burn-in duration of the discharge vessel, so that by the time the idle time has elapsed, the infrared component of the lamp light itself has dropped to a value that no longer adulterates the sensor signals in the way described above.

However, this known version is still problematic in that in the winter, for instance, at low outdoor temperatures, the burn-in duration of fluorescent lamps is substantially longer, because of the lower mercury vapor pressure, than in summertime at higher temperatures, and so under extreme conditions, the fixed idle time predetermined by the idle time member is shorter than the burn-in time that is established at low temperatures, and so even in this version, the above-described instabilities in the lamp triggering can still occur.

Similar problems arise when the fluorescent lamp is provided with an opaline covering, so that the infrared component emitted by the discharge vessel is reflected in the direction of the sensors to a greater extent than is the case in lamps with transparent coverings.

SUMMARY OF THE INVENTION

It is one object of the invention to provide a method for triggering a sensor-controlled lamp, and a sensor-controlled lamp itself, in which adulteration of the sensor signals by superimposed interference signals is minimized, even under unfavorable operating conditions.

To attain this and other objects, one aspect of the invention is directed to a method for triggering a sensor-controlled lamp in which the incident light is detected via a light sensor, and via a control unit (16) a luminous medium of the lamp is triggered as a function of the sensor signal. A change over time in the sensor signal is detected, and control parameters are defined for triggering the luminous medium as a function of the magnitude and of the change over time of the sensor signal.

Another aspect of the invention is directed to a sensor-controlled lamp, which is triggerable by the above-described method, having at least one sensor for detecting the incident light and having a control unit for triggering the lamp as a function of the sensor signal. A microprocessor detects a change over time in the sensor signal, stores the sensor signals, operating parameters and limit values in memory, and generates a control signal for changing an operating state of the lamp if the sensor signal exceeds or undershoots one of the limit values.

In accordance with preferred features of the invention, the lamp is provided with a microprocessor, by way of which the change in the sensor signal over time is detected on the basis of the incident light. As a function of these gradients in the sensor signal control parameters for triggering the luminous medium can then be defined. This makes it possible for the first time to control the triggering of the luminous medium as a function of the change over time in the incident light in such a way that external factors, such as temperature fluctuations, the type of coverings, sources of interference, etc., as well as the burn-in performance are detected via the gradient and taken into account in the triggering.

The control via the change over time in the control signal makes it possible, for instance, to detect the reduction in the infrared component of the lamp light itself during the burn-in phase extremely exactly, so that during the burn-in phase, the lamp can be operated—regardless of the temperature, the condition of the lamp, the quality of the luminous medium, the power supply, the type of lamp covering, the mounted position, and so forth—in a mode in which the accidental light incidence causes no change in the operating state of the discharge vessel. Normal triggering of the lamp is effected only whenever the infrared component in the lamp light itself has faded, so that the change over time in the sensor signal is slight, because of the relatively constant incident light from the environment. In other words, this switchover is no longer dependent on a mean idle time that is adapted to typical operating conditions; instead, each time the fluorescent lamp is turned on, a new determination is made as a function of the operating conditions, so that proper functioning of the lamp is assured.

In conventional system, it was possible to effect a certain change in the turn-on and turn-off thresholds via external regulators that had to be adjusted manually—but these variants had to be readjusted as operating conditions (winter, summer, or place of use) changed, thus requiring considerable manual effort to make the necessary adaptations.

With an advantageous refinement of the invention, if a limit value of the change over time in the sensor signal is undershot, a turn-off or switching threshold is defined after each lamp starting event, which threshold is higher than the magnitude of the sensor signal by a predetermined value when the limit value is reached. In other words, in accordance with the invention these turn-off or switching thresholds are re-determined each time the lamp is started, making manual adaptation as in the above-described prior art is unnecessary. When this threshold value is reached, the lamp can for instance be turned off, since it can then be assumed that there is enough daylight. It is understood that instead of turning off the lamp, a switch can be made to other operating states instead, such as reducing the output, blinking, dimming, or the like.

Because of the detection of the change over time in the sensor signal, it is also possible to blank out interference signals from external extraneous light—such as headlights of cars, floodlights of neighboring buildings, etc.—since as a rule these sources of accidental light are associated with an abrupt increase in brightness. That is, from the abrupt change in the control signal, the conclusion drawn is that an accidental light is present, and according to the invention an idle time is switched that runs until the accidental light no longer affects the ambient light. In other words, during this idle time the triggering of the discharge vessel is not changed.

To prevent an attendant excessively long burning of the discharge vessel, the turn-off threshold is raised as the idle time progresses, until it exceeds the sensor signal resulting from the accidental light. With the onset of brightness, the sensor signal then increases, so that despite the fact that accidental light is still present, the turn-off threshold is exceeded, and the discharge vessel is turned off.

Via the microprocessor, an emergency shutoff can also be predetermined, by way of which the lamp is turned off automatically if a predetermined maximum sensor signal is exceeded.

Detecting the incident light over time via the microprocessor makes it possible to detect a characteristic light curve as a function of a light changing cycle, such as a daily cycle, so that with a known characteristic light curve, a conclusion about the cycle time, such as the time of day, can be drawn from the change over time in the sensor signal. The function of the lamp can then be controlled as a function of this cycle time ascertained.

The fluorescent lamp of the invention is preferably embodied with two sensors, and the signals of the two sensors are evaluated in the microprocessor either independently of one another or jointly.

The lamp can be made especially compact if the microprocessor, the sensors and the lamp controller (ballast, etc.) are all received on a single common printed circuit board.

The operational reliability of the sensor-controlled lamp can be enhanced if a program for a test cycle is stored in the microprocessor and is run when the lamp is put into operation or if the sensors are arbitrarily covered. Within the scope of this test cycle, the lamp can be turned on and off at predetermined time intervals, for instance, so the user can easily be persuaded that the lamp is functional.

DETAILED DESCRIPTION OF THE DRAWINGS

Figure 1:
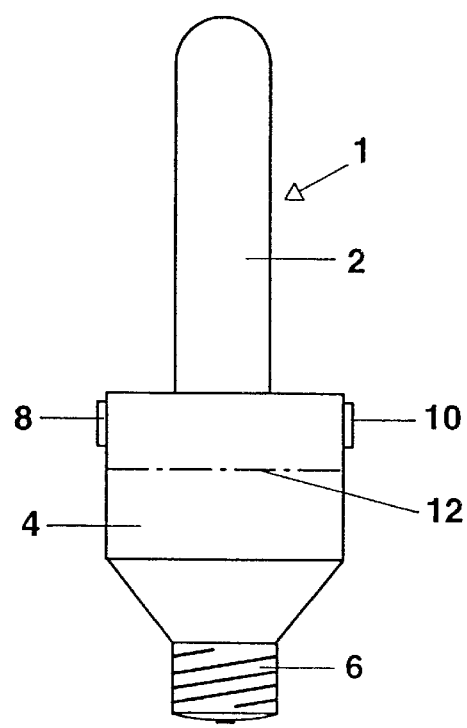
FIG. 1 is a view of a fluorescent lamp of the invention.

FIG. 1 is a schematic illustration of a fluorescent lamp 1. This lamp has a discharge vessel 2, whose end is secured in a lamp base housing 4. A screw-in base 6 for screwing the fluorescent lamp 1 into a lamp socket is embodied on the end portion of the housing 4 that is remote from the discharge vessel. Two diametrically opposed infrared sensors 8, 10 are located on the outer circumference of the lamp base housing 4, and by way of them the infrared component of the incident light can be ascertained. A printed circuit board 12 indicated by dot-dash lines is received in the interior of the housing 4, and the two infrared sensors 8, 10, a microprocessor 14 and the usual lamp ballast 16 (see FIG. 2) for triggering the discharge vessel 2 are received on the printed circuit board. As will be explained in greater detail hereinafter, the microprocessor 14, from the course over time of the light striking the sensors 8, 10, is capable of setting certain switching thresholds and changing them and can thus assure an optimal adaptation of the lamp triggering as a function of the condition of the lamp, the power supply, and ambient conditions.

Figure 2:
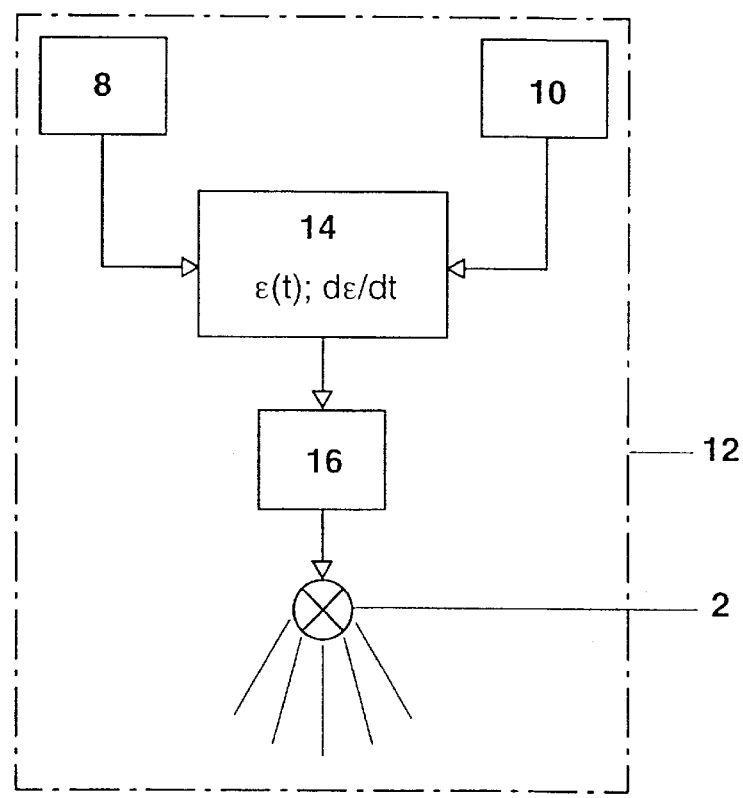
FIG. 2 shows a block diagram of a circuit of the fluorescent lamp of the invention.

FIG. 2 shows a highly simplified circuit diagram of the circuit that is received on the printed circuit board 12 shown in dot-dash lines. Accordingly, the input signal $\epsilon$, corresponding to the incident light, of the two sensors 8, 10 is detected as a function of the measurement time, and the gradient $d\epsilon/dt$ is formed from these detected, memorized sensor signals. As a function of these time-dependent values $\epsilon$ and $d\epsilon/dt$, the ballast 16 for the discharge vessel 2 is then triggered, so as to change its operating state (ON/OFF, dimming, blinking, etc.).

Figure 3:
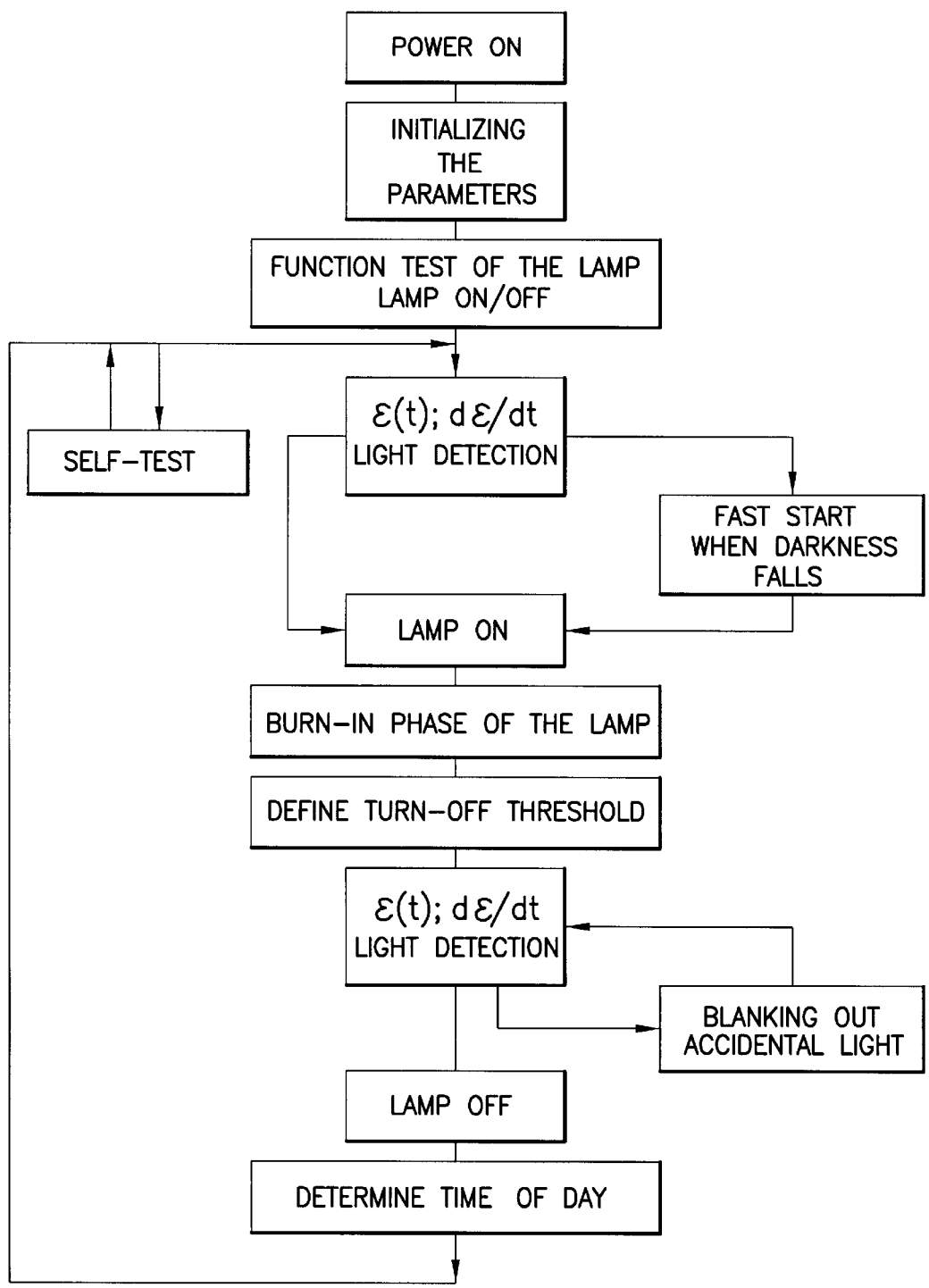
FIG. 3 shows a flow chart for explaining the function of the fluorescent lamp of FIG. 1.

FIG. 3 shows a flow chart of the program, which is controlled via the microprocessor 14. The program is started as soon as the fluorescent lamp 1 is screwed into the lamp socket and a connection with the power supply is made. After the first time the fluorescent lamp 1 is put into operation, first some of the parameters necessary for controlling the lamp are initialized; for instance, data stored in the memory of the microprocessor 14 are read out or are adapted as a function of the current incident light. These parameters stored in the memory of the microprocessor 14 can for instance be threshold values for turning the discharge vessel on and off, control times such as a self-test time, and maximum times for detecting operating states (burn-in duration, idle times for blanking out interference signals, etc.).

This initialization of parameters is followed, via the program control, by the initiation of a function test of the fluorescent lamp 1; after a predetermined time has elapsed, the lamp is turned on, and then turned off again after a brief burning time. This self-test can for instance always be performed whenever the lamp is connected to the power supply, so that the user is immediately informed as to the operational readiness of the fluorescent lamp.

After this self-test has been performed, the normal detection of light ensues via the two sensors 8, 10; the sensor signals are stored in memory as a function of time, and the aforementioned gradient $d\epsilon/dt$ is formed from the stored values.

Figure 4:
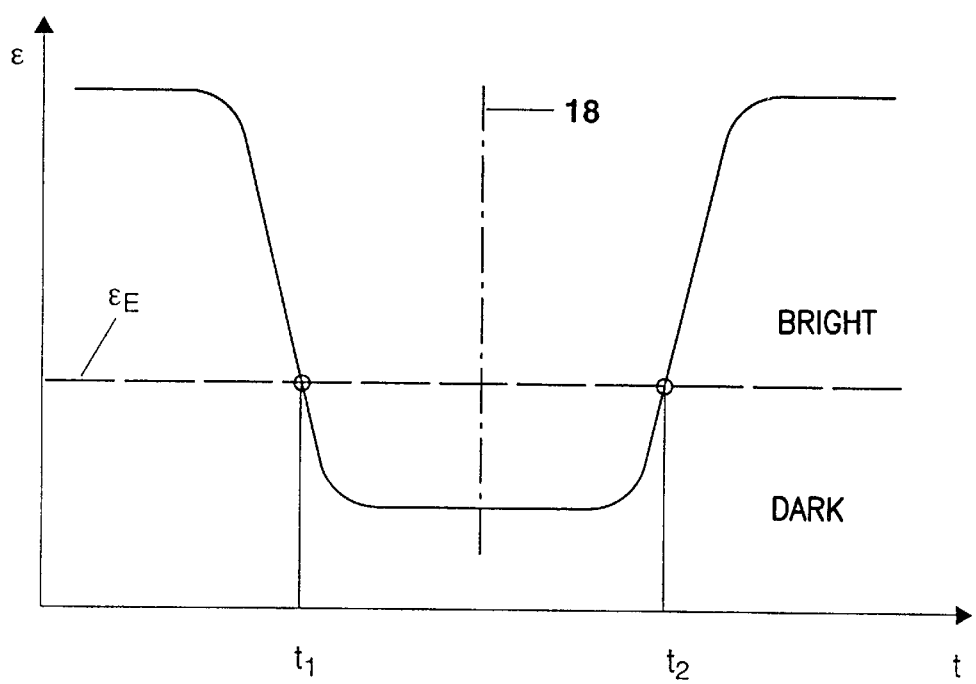
FIG. 4 is a graph that shows the course over time of the ambient incident light over one daily cycle.

FIG. 4 shows the course over time of the sensor signal $\epsilon$ as a function of the time of day t. In daylight the sensor signal is at a high level, which is substantially above a turn-on threshold $\epsilon_E$ that is stored in memory in the initialization and that is optionally adapted to the ambient conditions. When darkness falls, the sensor signal $\epsilon$ become weaker, and at time t1 it drops below the turn-on thresholds $\epsilon_E$, So that the program detects the ambient condition "dark" and generates a control signal to turn on the discharge vessel 2. When it is completely dark, the sensor signal $\epsilon$ remains at an approximately constant low level, and only when day begins to break in the morning does it rise again to the threshold value $\epsilon_E$, which it reaches at time t2. When a predetermined turn-off threshold, which is not necessarily the same as the turn-on threshold $\epsilon_E$, is reached, the discharge vessel 2 is turned off. The sensor signal $\epsilon$ detected by the sensor when the lamp is off rises as the brightness increases, until it reaches its maximum level around noon.

In the event that the microprocessor 14 detects that the sensor signal $\epsilon$ is below the turn-on threshold $\epsilon_E$ when the supply voltage is applied, or in other words that the sensor signal is in the dark range, a fast start of the lamp is performed, and the discharge vessel 2 is turned on. If the sensor signal is still in the bright range, the incident light and the gradient d$\epsilon$/dt are detected at predetermined time intervals, and the lamp is turned on if the sensor signal $\epsilon$ is below the turn-on threshold $\epsilon_E$.

After the lamp has been turned on, the burn-in phase of the lamp is then detected from the gradient d$\epsilon$/dt, and after the end of the burn-in phase, a turn-off threshold is defined.

Even with the lamp burned in, the light detection continues with the evaluation of the sensor signals $\epsilon$ and the formation of the gradients d$\epsilon$/dt. If accidental light occurs while the discharge vessel 2 is on, then via the program control blanking out of the accidental light can be done, by way of which the influence of the accidental light can be compensated for and thus has no influence on the operating state of the discharge vessel.

After the turn-off threshold, defined during the running of the program, has been exceeded, the lamp 1 is turned off, and a time of day which enables time-dependent program control is ascertained, optionally from the characteristic curve shown in FIG. 3. The program control then returns to its outset state once the parameters have been initialized and the one-time function test has been performed.

The flow chart of FIG. 3 also indicates that a self-test can be performed even during the program cycle, in order to check the fluorescent lamp 1.

In the exemplary embodiment described above, the fluorescent lamp 1 has two sensors 8, 10. The sensor signals $\epsilon$ of both sensors can be processed (in the microprocessor) separately from one another or, after weighting (mean value), jointly.

As already explained above, the incident light from the environment can have the light of the discharge vessel 2 itself, or from interference sources, superimposed on it, as a result of which the sensor signals $\epsilon$ do not represent the actual incident light from the environment. The microprocessor control according to the invention also makes it possible to recognize such error sources from the gradient d$\epsilon$/dt and to output appropriate correction signals to the lamp controller. This will be explained in conjunction with FIGS. 5–7.

Figure 5:
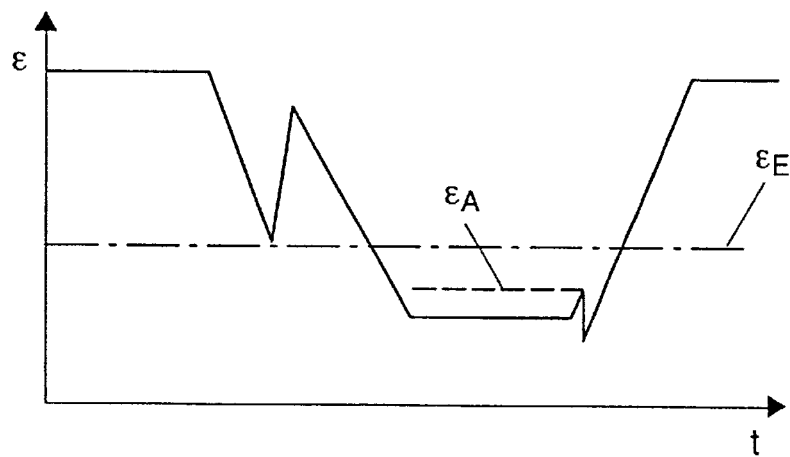
FIG. 5 is a graph that shows the course over time of a sensor signal over one cycle.

The characteristic curve shown in FIG. 4 represents an ideal state, in which the sensor signal $\epsilon$ is not adulterated by extraneous factors or by a component of the lamp light itself. In reality, a sensor signal ensues as shown in FIG. 5. As in the above-described ideal state, at the transition from daylight to darkness, the sensor signal $\epsilon$ drops toward the turn-on threshold $\epsilon_E$, so that when this turn-on threshold $\epsilon_E$ is reached the fluorescent lamp 1 is turned on. This can be fixedly predetermined in the memory of the microprocessor, but it is also possible in principle to adapt this turn-on threshold dynamically as a function of the characteristic curve shown in FIG. 4, so that seasonal factors, the instant of initialization, or the location of the lamp can be taken into account.

Immediately after the discharge vessel 2 is turned on, the sensor signal $\epsilon$ rises because of the comparatively high proportion of infrared in the lamp light itself, so that the sensor signal moves back into the bright range. Once the burn-in duration has elapsed, the proportion of infrared in the lamp light itself drops, so that the sensor signal drops back below the turn-on threshold $\epsilon_E$, and after lamp is completely burned in, the sensor signal is then determined essentially only by the incidence of light from the environment. During the burn-in phase, the curve course is then as shown in FIG. 5, with another overswing into the bright range and a drop of the sensor signal into the dark range; the end of the burn-in phase is characterized by the transition to the approximately horizontally extending portion of the sensor signal.

By evaluation of the gradient d$\epsilon$/dt, the burn-in phase ca be detected reliably from the above-described changes in the sensor signal; the controller reacts to the ending of the burn-in phase whenever the gradient d$\epsilon$/dt is smaller than a limit value $E_1$. As long as the gradient d$\epsilon$/dt is greater than this limit value $E_1$, the overswing of the sensor signal into the bright range remains out of consideration, so that the microprocessor 14 does not output any control signals for turning off the discharge vessel to the ballast 16. The influence of the lamp light itself is thus reliably suppressed during the burn-in phase.

After the burn-in phase, that is once the gradient d$\epsilon$/dt has fallen below the limit value $E_1$, a turn-off threshold $\epsilon_A$ is defined via the program control; this threshold is higher by a predetermined value than the sensor signal at which the burn-in phase was ended. That is, the turn-off threshold $\epsilon_A$ is re-defined after each turn-on of the discharge vessel 2, so that any influence of sources of error, such as the outdoor temperature (change in the proportion of infrared light from fluctuations in the mercury vapor pressure), fluctuations in the power supply, or the age of the lamp are compensated for.

As the brightness increases, the sensor signal $\epsilon$ rises and reaches the turn-off threshold $\epsilon_A$ defined after the burn-in phase, so that the discharge vessel 2 is turned off. Because of the turning off of the discharge vessel 2, the proportion of infrared still existing in the incident light, which is comparatively slight, disappears, so that once again the sensor signal drops briefly into the dark range and then, with increasing brightness, rises again as shown in FIG. 5; the cycle can now begin over again.

Figure 6:
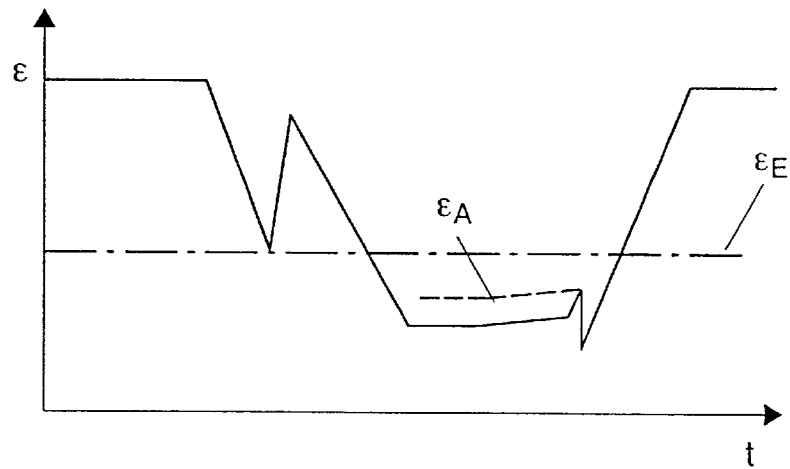
FIG. 6 is a graph that shows the course over time of a sensor signal under varying ambient conditions.

The control shown in FIG. 6 is distinguished from the control shown in FIG. 5 only in that the turn-off threshold $\epsilon_A$ ascertained after the burn-in phase is not kept constant, as in the exemplary embodiment described above, but instead is changed dynamically as a function of the course of the sensor signal in the dark range. This kind of dynamic tracking of the turn-off threshold $\epsilon_A(t)$ makes it possible to compensate for slow changes in the sensor signal, caused for instance by temperature changes during the dark phase (especially in wintertime). In other words, if the temperature drops comparatively sharply overnight, the proportion of infrared light in the lamp light itself is increased because of the decreasing mercury vapor pressure, and thus the sensor signal rises slightly in the dark range. The gradient $d\epsilon/dt$ of the sensor signal is substantially less, however, than during the burn-in phase, so that the lamp controller remains in its normal mode and does not decide that a burn-in phase is occurring. The turn-off threshold is then changed, as a function of this slight gradient $d\epsilon/dt$, as shown in FIG. 5, and the turn-off threshold $\epsilon_A$ is always higher, by a predetermined value, above the applicable sensor signal.

To prevent a change in the turn-off threshold as the brightness increases, the dynamic change in the turn-off threshold can be limited to a predetermined time range of the characteristic curve shown in FIG. 4, so that in the morning hours there is no dynamic tracking of the turn-off threshold.

Figure 7:
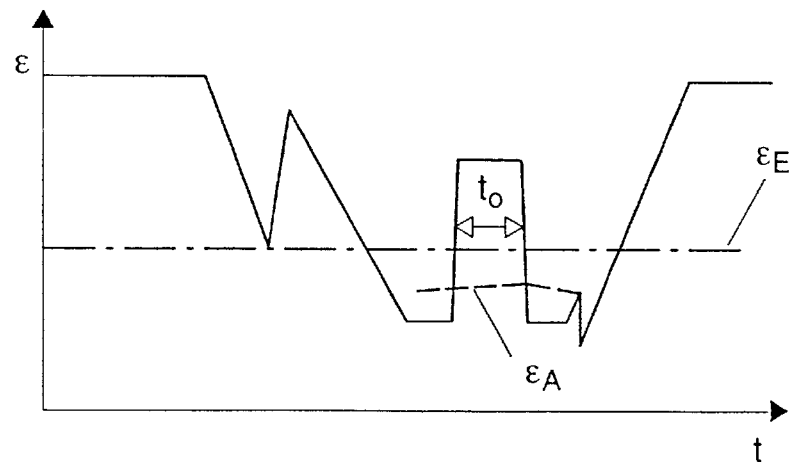
FIG. 7 is a graph that shows the course over time of a sensor signal on the occurrence of accidental light.

In conjunction with FIG. 7, the case will be addressed in which during the dark phase, there is an occurrence of accidental light, caused for instance by car headlights or a floodlight of a neighboring building. This accidental light increases the proportion of infrared in the light detected by the sensors 8, 10, so that the sensor signal rises abruptly and exceeds the turn-off threshold $\epsilon_A$ determined as described above.

This abrupt rise in the sensor signal $\epsilon$ leads to an increase in the gradient $d\epsilon/dt$ in the transitional range. An accidental light limit value $E_2$ is stored in the memory of the microprocessor 14, and the gradient $d\epsilon/dt$ is compared with it. If this gradient exceeds the accidental light limit value $E_2$, the program control decides that an occurrence of accidental light exists, and during a certain idle time $t_0$ it does not output any control signal for changing the operating state of the discharge vessel 2. Once the idle time $t_0$ has elapsed, the gradient between the current sensor signal and the previous sensor signal, measured in the dark region, is formed and again compared with the accidental light limit value $E_2$. In the event that this gradient is still greater than the accidental light limit value $E_2$, the idle time is lengthened once again by the value $t_0$. This cycle is repeated until the effect of the accidental light has disappeared and the sensor signal has again dropped below the turn-off threshold $\epsilon_A$.

To prevent the discharge vessel 2 from burning too long, the number of idle time cycles can be limited, or else in each idle time cycle the turn-off threshold can be increased until it exceeds the level of the sensor signal $\epsilon$ that results from the accidental light. As the daylight becomes brighter, this sensor signal, with accidental light superimposed on it, then increases again, so that the increased turn-off threshold is exceeded, and the lamp 1 is turned off as described above.

The self-test for checking the operational readiness of the lamp, described in conjunction with FIG. 3, can be performed for example by shading the sensors 8, 10 of the lamp 1.

This shading of the sensors 8, 10 causes a sudden drop in the sensor signal, so that on the basis of the resultant gradient $d\epsilon/dt$, if a further self-test limit value fails to be attained, the self-test described at the outset, involving turning the lamp on and off, is initiated.

An emergency-OFF limit value can also be stored in the memory of the microprocessor 15; when this limit value is exceeded, a signal to turn off the fluorescent lamp 1 is output by the microprocessor 14. Via this emergency-OFF limit value it is assured that the lamp will be turned off when a certain brightness range is reached, even if the program sequence is erroneous.

The operational reliability of the lamp of the invention can be improved still further if a maximum running time is stored in the memory of the microprocessor 14, so that if a maximum value for the burn-in duration, for instance, is exceeded, the turn-off threshold will be defined as a function of the last sensor signal detected.

As already indicated above, from the course of the characteristic curve in FIG. 4 a conclusion can be drawn about the time of day, and it can be assumed that an axis of symmetry 18 of the characteristic curve in FIG. 4 is approximately equivalent to a time from midnight to 12:30 a.m., so that even when the characteristic curve is detected over 24 hours, a relatively precise determination of the clock time, or time of day, can be made. As a function of this clock time, the above described parameters can then additionally be monitored and changed.

A sensor-controlled lamp and a method for triggering it are disclosed in which the sensor signals are evaluated by means of a microprocessor, and operating parameters of the lamp controller are changed or activated on the basis of the change in the sensor signals over time.

What is claimed is:

1. A method for triggering a sensor-controlled lamp (1), in which the incident light is detected via a light sensor (8, 10), and via a control unit (16) a luminous medium of the lamp (1) is triggered as a function of the sensor signal ($\epsilon$), characterized by the steps of detecting a change over time in the sensor signal ($d\epsilon/dt$), and defining control parameters ($\epsilon_E$, $\epsilon_A$, $t_0$) for triggering the luminous medium (2) as a function of the magnitude ($\epsilon$) and of the change over time ($d\epsilon/dt$) of the sensor signal.

2. The method of claim 1, wherein if a limit value ($E_1$, $E_2$) for the change over time of the sensor signal ($d\epsilon/dt$) is exceeded or undershot, the associated sensor value ($\epsilon$) is compared with a threshold value ($\epsilon_E$, $\epsilon_A$), and if this threshold value is exceeded or undershot, the operating state of the luminous medium is changed.

3. The method of claim 2, wherein after the limit value ($E_1$) is undershot a turn-off threshold ($\epsilon_A$) is defined, which is greater, by a predetermined value, than the magnitude of the sensor signal ($\epsilon$) if the limit value ($E_1$) is undershot.

4. The method of claim 2, wherein if the change over time in the sensor signal ($\epsilon$), which change exceeds an accidental light limit value ($E_2$), occurs after the switching value has been defined, no control signal for changing the operating state of the luminous medium is output during a predetermined idle time ($t_0$).

5. The method of claim 4, wherein the idle time ($t_0$) is lengthened, as long as the sensor signal ($\epsilon$) remains at the changed level, as the idle time ($t_0$) increases, the switching threshold ($\epsilon_A$) is raised, until the changed level of the sensor signal ($\epsilon$) is reached.

6. The method of claim 1, wherein a turn-off signal is output via a microprocessor (14) when the sensor signal ($\epsilon$) exceeds an emergency-OFF limit value stored in the memory of the microprocessor (14).

7. The method of, claim 1, wherein sensor signals ($\epsilon$) detected during a light changing cycle are stored in the memory of a microprocessor (14) and from them a characteristic curve is ascertained, from which a conclusion can be drawn about the cycle time (t) as a function of the sensor signal ($\epsilon$) detected.

8. The method of claim 7, wherein turn-off, switching or turn-on thresholds are changed or defined as a function of the cycle time.

9. The method of claim 1, wherein the lamp (1) has sensors (8, 10), and a microprocessor (14) processes the sensor signals ($\epsilon$) separately from one another or jointly in weighted fashion and outputs control signals to a lamp controller for the luminous medium.

10. The method of claim 1, wherein upon connection to a power supply or when the sensor (8, 10) is covered, a test cycle is performed, in which the lamp (1) is turned on and off at predetermined time intervals.

11. The method of claim 1, wherein a predetermined turn-on value ($\epsilon_E$) is varied as a function of the incident light at the time when the lamp (1) is put into operation.

12. A sensor-controlled lamp, which in particular is triggerable by the method of claim 1, having at least one sensor (8, 10) for detecting the incident light and having a control unit for triggering the lamp (1) as a function of the sensor signal ($\epsilon$), characterized by a microprocessor (14) for detecting a change over time in the sensor signal ($d\epsilon/dt$), for storing the sensor signals and operating parameters and limit values ($E_1$, $E_2$) in memory, and for outputting a control signal for changing an operating state of the lamp (1) if the sensor signal ($\epsilon$) exceeds or undershoots one of the limit values ($\epsilon_E$, $\epsilon_A$).

13. The sensor-controlled lamp of claim 12, wherein two sensors (8, 10) are provided, whose signals can be processed separately or jointly by the microprocessor (14).

14. The sensor-controlled lamp of claim 12, wherein for detecting, storing and processing the sensor signals ($\epsilon$), two sensors (8, 10) and the control unit (16) are disposed on a common printed circuit board (12).

15. The sensor-controlled lamp of claim 12, wherein the lamp is a fluorescent lamp (1), and the sensor (8, 10) is an infrared sensor.

* * * * *